(12) United States Patent
Viswambharan et al.

(10) Patent No.: US 11,570,066 B1
(45) Date of Patent: Jan. 31, 2023

(54) SLICE INTENT EFFICIENCY ASSURANCE AND ENHANCEMENT IN ENTERPRISE PRIVATE 5G NETWORK

(71) Applicant: Cisco Technology, Inc., San Jose, CA (US)

(72) Inventors: Rajesh Indira Viswambharan, Bangalore (IN); Girish Thimmalapura Shivanna, Tumkur (IN); Mahaveer Jain, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 3 days.

(21) Appl. No.: 17/369,173

(22) Filed: Jul. 7, 2021

(51) Int. Cl.
| | |
|---|---|
| *H04L 41/5041* | (2022.01) |
| *H04W 24/02* | (2009.01) |
| *H04W 28/02* | (2009.01) |
| *H04W 28/08* | (2009.01) |
| *H04W 24/10* | (2009.01) |
| *H04L 43/091* | (2022.01) |

(52) U.S. Cl.
CPC ........ *H04L 41/5045* (2013.01); *H04L 43/091* (2022.05); *H04W 24/02* (2013.01); *H04W 24/10* (2013.01); *H04W 28/0268* (2013.01); *H04W 28/0992* (2020.05)

(58) Field of Classification Search
None
See application file for complete search history.

(56) References Cited

U.S. PATENT DOCUMENTS

2017/0079059 A1* 3/2017 Li ................... H04W 16/02
2017/0310611 A1 10/2017 Kumar et al.
(Continued)

FOREIGN PATENT DOCUMENTS

EP 3800917 A1 4/2021
WO WO-2017078770 A1 * 5/2017 ........... G06F 9/5077
(Continued)

OTHER PUBLICATIONS

GSM Association, "Generic Network Slice Template", Version 4.0, Nov. 23, 2020, 66 pages.
(Continued)

*Primary Examiner* — Nathan S Taylor
(74) *Attorney, Agent, or Firm* — Edell, Shapiro & Finnan, LLC (57) ABSTRACT

An approach to configure enterprise wireless mobile network slices. A method includes receiving slice definition information representative of a network slice, the slice definition information including an expected slice efficiency index of the network slice, provisioning the network slice, consistent with the slice definition information, in a wireless network, receiving telemetry corresponding to operational metrics of an instance of the network slice that is used by one or more devices in the wireless network, calculating an actual slice efficiency index for the instance of the network slice based on the telemetry corresponding to the operation metrics of the instance of the network slice, determining whether the expected slice efficiency index differs from the actual slice efficiency index by a predetermined threshold, and indicating a course of action to cause the actual slice efficiency index to more closely align with the expected slice efficiency index.

20 Claims, 5 Drawing Sheets

(56) References Cited

U.S. PATENT DOCUMENTS

| | | | |
|---|---|---|---|
| 2017/0332421 A1* | 11/2017 | Sternberg | H04W 76/11 |
| 2019/0372853 A1* | 12/2019 | Bainbridge | H04L 49/354 |
| 2020/0154292 A1 | 5/2020 | Bor-Yaliniz et al. | |
| 2020/0195495 A1* | 6/2020 | Parker | H04L 41/082 |
| 2020/0244588 A1* | 7/2020 | Filsfils | H04L 47/24 |
| 2020/0259896 A1* | 8/2020 | Sachs | H04L 63/0823 |
| 2020/0313983 A1* | 10/2020 | Stammers | H04L 41/40 |
| 2020/0382374 A1 | 12/2020 | Yi et al. | |
| 2021/0083933 A1 | 3/2021 | Bull et al. | |
| 2021/0136680 A1* | 5/2021 | Browne | H04W 52/0203 |
| 2021/0144517 A1* | 5/2021 | Guim Bernat | H04W 12/04 |
| 2021/0204164 A1* | 7/2021 | Yavuz | H04L 47/781 |
| 2021/0297876 A1* | 9/2021 | Bellamkonda | H04L 41/0823 |
| 2021/0306230 A1* | 9/2021 | Arita | H04L 41/40 |
| 2022/0030510 A1* | 1/2022 | Fukuoka | H04W 76/12 |
| 2022/0046084 A1* | 2/2022 | Nair | G06F 9/5077 |
| 2022/0166626 A1* | 5/2022 | Madisetti | H04L 9/3239 |
| 2022/0167236 A1* | 5/2022 | Melodia | H04W 28/0236 |
| 2022/0239568 A1* | 7/2022 | Celozzi | H04L 41/5051 |
| 2022/0247678 A1* | 8/2022 | Atwal | H04L 65/1104 |
| 2022/0255798 A1* | 8/2022 | Yavuz | H04L 41/0893 |

FOREIGN PATENT DOCUMENTS

| | | |
|---|---|---|
| WO | 2019233420 A1 | 12/2019 |
| WO | WO-2021181408 A1 * | 9/2021 |
| WO | WO-2021221558 A1 * | 11/2021 |

OTHER PUBLICATIONS

Anritsu, "A Bottom-Up Approach to 5G Network Slicing Security in User Equipment", Feb. 2021, 14 pages.

Min Xie et al., "Towards Closed Loop 5G Service Assurance Architecture for Network Slices as a Service", 2019 European Conference on Networks and Communications (EuCNC), IEEE, Jun. 18-21, 2019, 5 pages.

Marin Orlić et al., "An introduction to machine reasoning in networks", Ericsson, Nov. 5, 2019, 9 pages.

* cited by examiner

SLICE INTENT EFFICIENCY ASSURANCE AND ENHANCEMENT IN ENTERPRISE PRIVATE 5G NETWORK

TECHNICAL FIELD

The present disclosure relates to defining and monitoring a custom slice in a 5G wireless network.

BACKGROUND

The fifth generation (5G) network architecture is a significant departure from fourth generation (4G) Long Term evolution (LTE) network architectures. 4G LTE provided an Internet Protocol (IP) data pipe primarily designed for the delivery of voice, video, and other multimedia services, and included secondary provisions for supporting machine-to-machine (M2M) and Internet-of-Things (IoT) applications. In contrast, the 5G standard was specifically architected so that it could be optimized for a range of use cases.

To this end, the 5G network architecture implements a feature called network "slicing," which enables network providers to create virtual end-to-end network connections with clearly defined channel capacities, quality of service (QoS) parameters, priority levels, and security requirements that are tailored to application requirements and user equipment (UE) capabilities. Given the flexibility of network slicing, applications running over a 5G network can range from sub-kbit/s, high-latency data streams used to read utility meters and manage streetlights in smart cities, to ultra-reliable low latency communication services that provide connectivity for critical applications such as autonomous vehicles, factory automation systems, and tele-surgery robots.

Notwithstanding the flexibility of network slicing, operating a 5G network efficiently in a given enterprise has a potentially steep learning curve, given that unique machinery and sensors might operate distinct applications and demand varying configuration and optimization. As a result, unlike a generic service provider setup, an enterprise 5G network setup might rely on customized 5G slices to satisfy overall application requirements and security considerations. In this regard, the generic network slice template (GST), defined by the GSM Association (GSMA), that may be used to define network slices may not provide sufficient utility for a network administrator to confidently provision network slices in a given enterprise 5G network deployment.

DESCRIPTION OF EXAMPLE EMBODIMENTS

Overview

Presented herein is a method to configure enterprise 5G network slices. The method includes receiving slice definition information representative of a network slice, the slice definition information including an expected slice efficiency index of the network slice, provisioning the network slice, consistent with the slice definition information, in a wireless network, receiving telemetry corresponding to operational metrics of an instance of the network slice that is used by one or more devices in the wireless network, calculating an actual slice efficiency index for the instance of the network slice based on the telemetry corresponding to the operation metrics of the instance of the network slice, determining whether the expected slice efficiency index differs from the actual slice efficiency index by a predetermined threshold, and in response to the expected slice efficiency index differing from the actual slice efficiency index by the predetermined threshold, indicating a course of action to cause the actual slice efficiency index to more closely align with the expected slice efficiency index In another embodiment, a device is provided. The device includes an interface configured to enable network communications, a memory, and one or more processors coupled to the interface and the memory, and configured to: receive slice definition information representative of a network slice, the slice definition information including an expected slice efficiency index of the network slice, provision the network slice, consistent with the slice definition information, in a wireless network; receive telemetry corresponding to operational metrics of an instance of the network slice that is used by one or more devices in the wireless network, calculate an actual slice efficiency index for the instance of the network slice based on the telemetry corresponding to the operation metrics of the instance of the network slice, determine whether the expected slice efficiency index differs from the actual slice efficiency index by a predetermined threshold; and in response to the expected slice efficiency index differing from the actual slice efficiency index by the predetermined threshold, indicate a course of action to cause the actual slice efficiency index to more closely align with the expected slice efficiency index.

Example Embodiments

In order to address the unique context of an enterprise 5G network deployment, advanced custom attributes, beyond those defined in GSMA's generic slice template, along with a mechanism to monitor the efficiency of provisioned network slices, are described. Where degradation or deviation in the quality of the created network slice is detected, the described embodiments can also help to identify issues causing such degradation or deviation, and suggest network modifications, thus helping improve network slice efficiency.

At a high level, an approach according to the described embodiments provides a closed loop system to create and assure custom network slices in an enterprise private 5G network. This is accomplished using, in part, an "enterprise slice template" (EST) with advanced attributes, along with a pre-selected expected "slice efficiency index" (SEI) that is continuously, or periodically, assessed to determine an efficiency level of a given instance of the network slice. When so indicated, logic recommends changes to the network slice to meet the pre-selected SEI, or at least decrease the gap between the expected SEI of the network slice and the actual SEI of the network slice instance.

Figure 1:
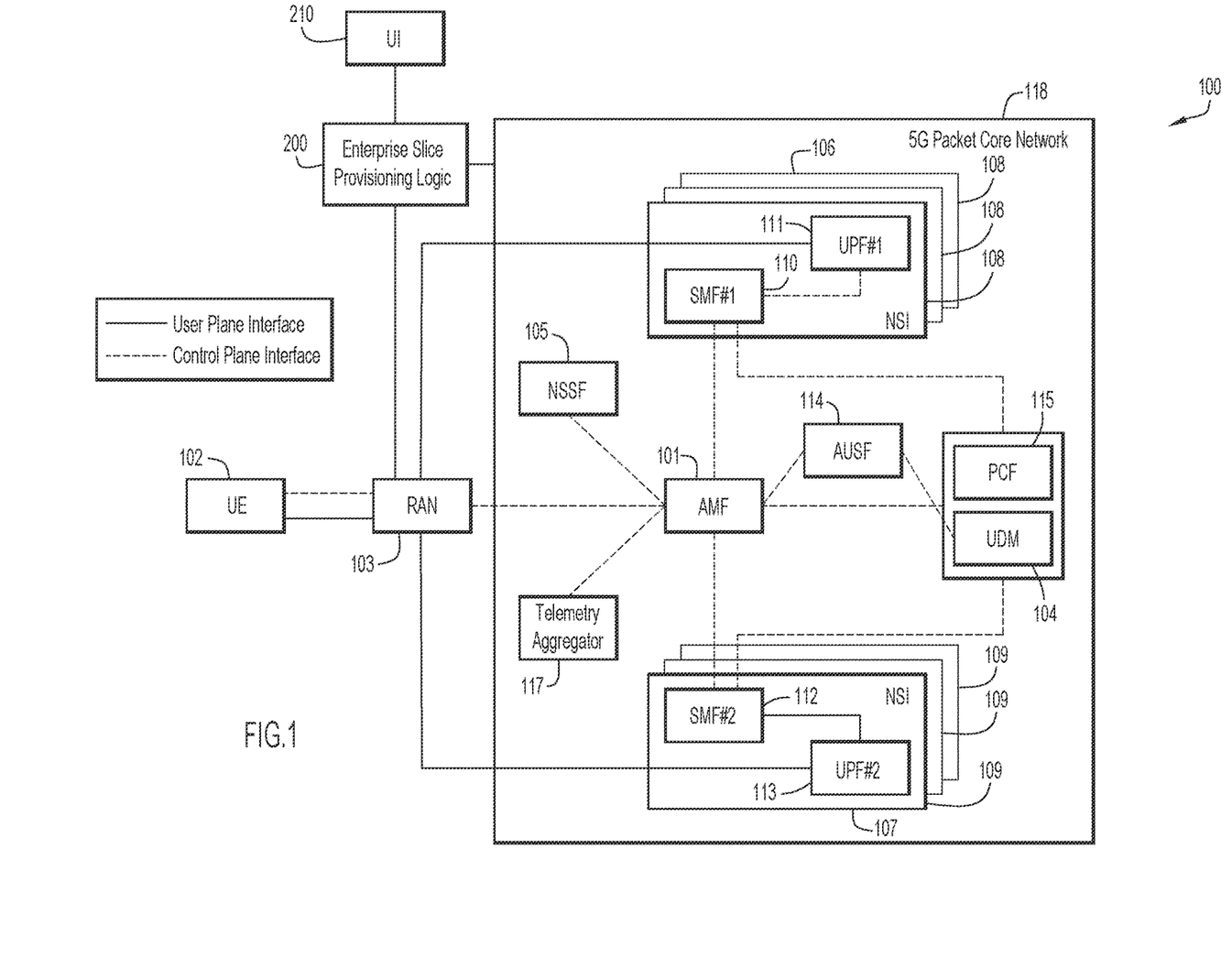
FIG. 1 shows a system, including a 5G packet core, a radio access network, enterprise slice provisioning logic, and a user interface, according to an example embodiment.

FIG. 1 shows a system, including a network 100, enterprise slice provisioning logic 200, a user interface 210, a 5G packet core network 118, and a radio access network (RAN) 103, according to an example embodiment. More specifically, network 100 is configured, e.g., according to a 5G architecture as specified by the Third Generation Partnership Project (3GPP).

Network 100 includes a mobile radio terminal device, i.e., UE 102, which could be a mobile phone, tablet, computer, and the like.

Network 100 further includes RAN 103, which may include a plurality of radio access network nodes, i.e., base stations configured to provide radio access in accordance with a 5G radio access technology. Each radio access network node may provide radio communication with UE 102 over an air interface. It should be noted that RAN 103 may include any number of radio access network nodes.

Network 100 still further includes 5G packet core network 118 including an Access and Mobility Management Function (AMF) 101 connected to RAN 103, a Unified Data Management function (UDM) 104, and a Network Slice Selection Function (NSSF) 105. UDM 104 may further include a UE subscription database, which is known as, for example, a Unified Data Repository (UDR) (not shown). 5G packet core network 118 may further include an Authentication Server Function (AUSF) 114 and a Policy Control Function (PCF) 115. The foregoing elements are shown in communication with one another via one or both of a user plane interface or control plane interface.

UE 102 forms a terminal side of network 100, while 5G packet core 118 and RAN 103 are considered part of a mobile radio communication network side of network 100.

5G packet core network 118 may support multiple network slices (e.g., first network slice 106, second network slice 107), and for each such slice an operator or administrator may create multiple network slice instances (NSIs) 108, 109. For example, the 5G packet core network 118 includes first network slice 106 with three network slice instances (NSIs) 108 and second network slice 107 with three network slice instances (NSIs) 109.

When a network slice is deployed, network functions (NFs) are instantiated, or, if already instantiated, referenced to form a given NSI 108 or NSI 109. More specifically, in the example shown in FIG. 1, each NSI 108 of the first network slice 106 includes a first Session Management Function (SMF #1) 110 and a first User Plane Function (UPF #1) 111, and each NSI 109 of the second network slice 107 includes a second Session Management Function (SMF #2) 112 and a second User Plane Function (UPF #2) 113. SMF #1 110 and SMF #2 112 are configured to handle Protocol Data Unit (PDU) sessions, i.e., to create, update and remove PDU sessions and manage session context with the appropriate UPF #1 111, UPF #2 113.

5G packet core network 118 may further include a telemetry aggregator 117, which is configured to provide network analysis information (e.g., operational metrics), upon request, about network functions. For example, telemetry aggregator 117 may request specific telemetry on the load level of a particular network slice. Alternatively, telemetry aggregator 117 may leverage a subscribe service to ensure that it is notified if a load level of a given network slice changes or reaches a specific threshold. Telemetry aggregator 117 may have an interface to various network functions on the mobile radio communication network side of network 100, e.g., to AMF 101, SMF #1 110, SMF #2 112 and PCF 115. For simplicity, only the interface between the telemetry aggregator and AMF 101 is depicted.

Network 100 also includes enterprise slice provisioning logic 200, along with a corresponding user interface 210 that is in communication with RAN 103 and 5G packet core network 118.

Figure 2:
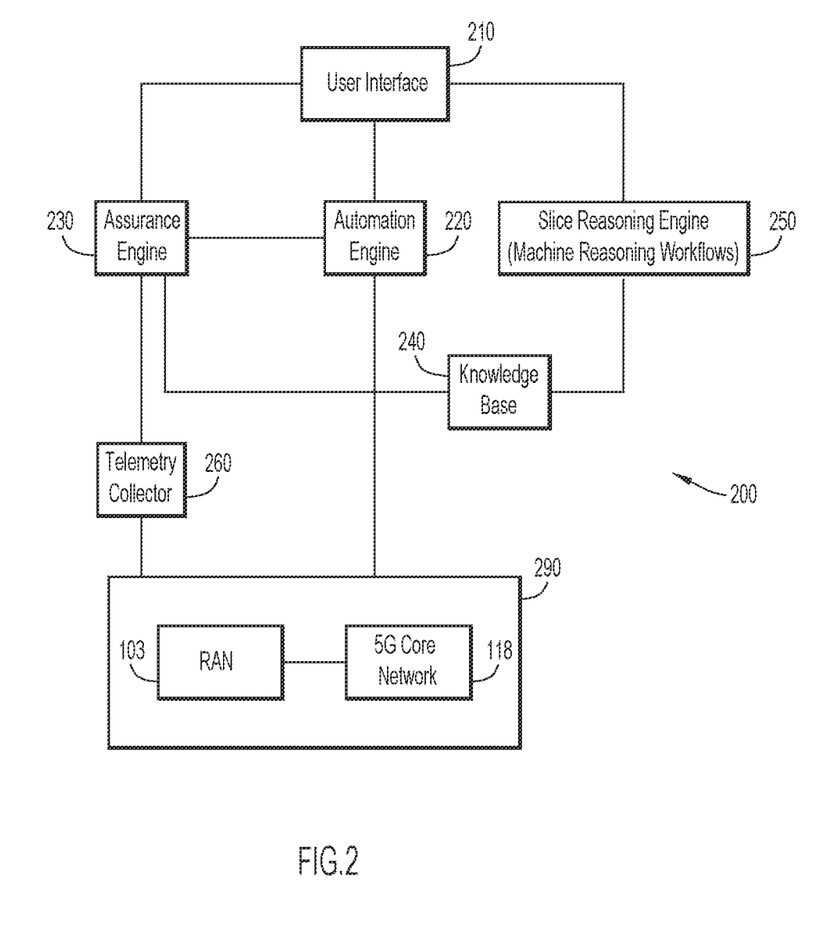
FIG. 2 shows implementation details of the enterprise slice provisioning logic, according to an example embodiment.

FIG. 2 shows implementation details of enterprise slice provisioning logic 200, according to an example embodiment. Enterprise slice provisioning logic 200 includes automation engine 220, assurance engine 230, knowledge base 240, slice reasoning engine 250, and telemetry collector 260. The forgoing elements may be hosted on a server, e.g., a cloud server, that is consistent with the hardware depicted in FIG. 5 and described later herein. The several elements of enterprise slice provisioning logic 200 depicted in FIG. 2 are in communication with one another, and with RAN 103 and 5G packet core network 118 (combined as reference numeral 290) as shown. However, those skilled in the art will appreciate that those elements of enterprise slice provisioning logic 200 may also be combined, or further distributed, depending on the particular implementation.

User interface 210 is in communication with enterprise slice provisioning logic 200 and is configured to enable an administrator to define custom network slices using, not only attributes defined by, e.g., GSMA's GST, but by also defining and/or using one or more of the following additional network slice attributes that extend the GST, and which may be considered part of the enterprise slice template (EST).

1. Allowed Site Information: This attribute defines in which sites/areas/buildings the slice is applicable, i.e., permitted. With an allowed site list, enterprise slice provisioning logic 200 prevents the network slice to be used within the boundaries of an unlisted site.

2. Service Function Chaining (SFC)/Network Function Header (NFH): This attribute defines the service function chaining to be used for the flows using the network slice. An administrator may define multiple security functions and stitch them together to meet requirements of different network slices.

3. Golden Image Index: This attribute enables an administrator to define a percentage of devices, used by a given network slice, that are operating using a qualified golden image. Telemetry returned to enterprise slice provisioning logic 200 may indicate, on a per device basis, whether a qualified golden image is being executed.

4. Common Vulnerability and Exposure (CVE) Index: This attribute defines a tolerable vulnerability level for devices in a path of a given network slice. Selected (e.g., more sensitive) devices may need to be considered less vulnerable due, e.g., to security or geographic reasons. Enterprise slice provisioning logic 200 is configured to ascertain a score for each device by capturing CVE information for the underlying images and hardware, etc., from returned telemetry.

5. Unclassified Application Index: This attribute designates a maximum percentage of unclassified applications that may be executing on devices accessed through the network slice. A lower index suggests that applications hosted by devices in the network slice path are well classified. This suggests that the enterprise has more confidence in the overall network.

6. Device Type Affinity: This attribute enables an administrator using enterprise slice provisioning logic 200 to define a specific class of devices, e.g., corporate devices, that are eligible to use a given network slice. The definition may be based on, e.g., MAC address, brand of mobile phone, etc.

7. Slice Efficiency Index (SEI): This attribute is used to indicate how efficiently the network slice is operating at a given site. An administrator can set or define an intended SEI, and then, on an on-going basis, enterprise slice provisioning logic 200 may calculate or determine an actual SEI for a given network slice instance.

Also, in an embodiment, enterprise slice provisioning logic 200 enables an administrator, via user interface 210, to specify a "priority index" or individual weights to one or more of the foregoing attributes used to define the network slice. Such a weight may then be used to calculate or determine the actual SEI for a given network slice instance.

Figure 3:
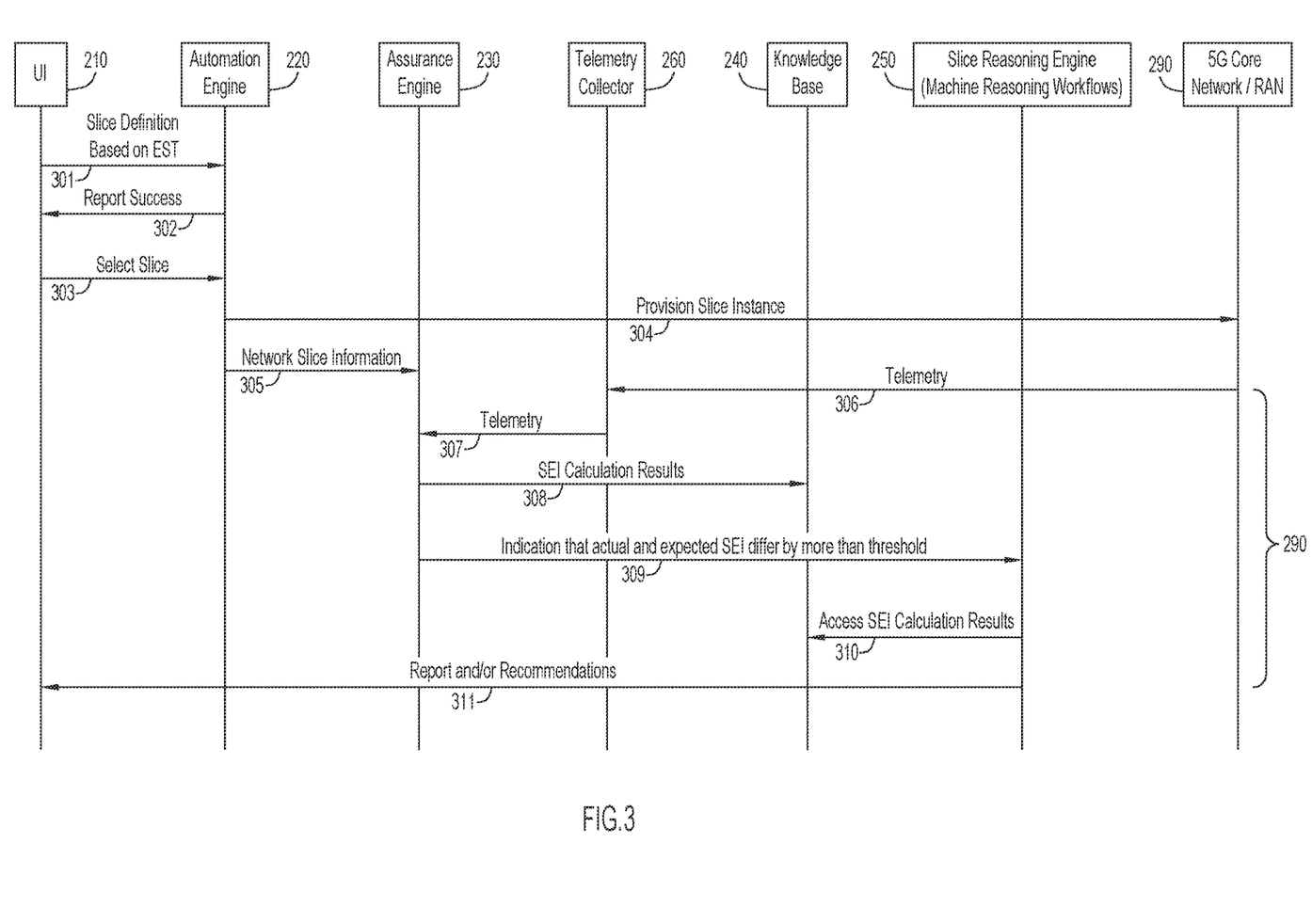
FIG. 3 shows a ladder diagram illustrating the interaction among several elements of the enterprise slice provisioning logic, the user interface, and the 5G packet core and radio access network, according to an example embodiment.

FIG. 3 shows a ladder diagram illustrating the interaction among several elements of enterprise slice provisioning logic 200, user interface 210, 5G packet core network 118, and radio access network 103, according to an example embodiment.

At 301, user interface 210, with input from an administrator, is configured to define one or more custom network slices using attributes including those enumerated above in connection with the EST. That information is, in turn, provided to automation engine 220. At 302, automation engine 220 translates the given EST (and other, e.g., GST parameters and attributes) to technical requirements and determines whether the site(s) identified in the "Allowed Site Information" attribute of the EST have the appropriate network infrastructure (e.g., security clearance) to support the network slice being defined. Assuming the appropriate network infrastructure is in place to support the network slice, automation engine 220 provides a report back to user interface 210 that the defined network slice can be deployed.

At 303, user interface 210 is configured to select the network slice to be provisioned to the given site. As previously noted, one of the attributes received by the user interface 210 and that is part of the EST is the expected slice efficiency index (SEI). This attribute is, e.g., a percentage number that an administrator initially selects and that represents an expected compliance of the network slice with the attributes of the GST and EST attributes. Information regarding the selected network slice is then passed to automation engine 220.

At 304, automation engine 220 communicates with network 100 including 5G packet core network 118 and RAN 103 along with any intermediary devices to instantiate an instance of the network slice, and further directs, e.g., telemetry aggregator 117 to collect relevant data about the actual operation of the network slice instance as it is used in network 100.

At 305, automation engine 220 provides assurance engine 230 the network slice related information and the sites where the network slice is configured to operate.

From this point, the following operations are performed in a looping fashion, continuously, or periodically, monitoring the state of the network slice instance and providing information back to enterprise slice provisioning logic 200 to assess the state of the network slice instance and to, based on that information, calculate an actual slice efficiency index that can be compared to the initial expected value of the SEI.

More specifically, at 306, network 100 (e.g., telemetry aggregator 117) supplies telemetry collector 260 with telemetry gathered from the devices with which the network slice instance interacts.

At 307, telemetry collector sends collected telemetry to assurance engine 230 where it is processed to calculate the actual slice efficiency index (SEI) for the underlying site. Assurance engine 230, at 308, sends results of the calculation to knowledge base 240. Knowledge base can also store historical data making it possible for assurance engine 230 to calculate SEI trends. In an embodiment, the expected or actual SEI is a value on a scale of 1-10 for a given slice or slice instance, respectively. The actual SEI, as noted, may be computed on a per site, per network slice instance.

At 309, in the event the actual SEI differs from the expected SEI by a predetermined threshold, assurance engine 230 notifies slice reasoning engine 250. At 310, slice reasoning engine 250 accesses knowledge base 240 and runs a series of workflows, including machine reasoning workflows, using data obtained from knowledge base 240, resulting in one or more recommendations regarding what to change and optimize to improve the actual SEI.

At 311, slice reasoning engine 250 supplies user interface 210 with report and/or recommendations that an administrator can follow to cause the actual slice efficiency index to more closely align with the expected slice efficiency index.

With that information in hand, an administrator can modify the provisioned network slice, request a change to physical equipment in network 100, and un-provision the network slice, among other possibilities.

Figure 4:
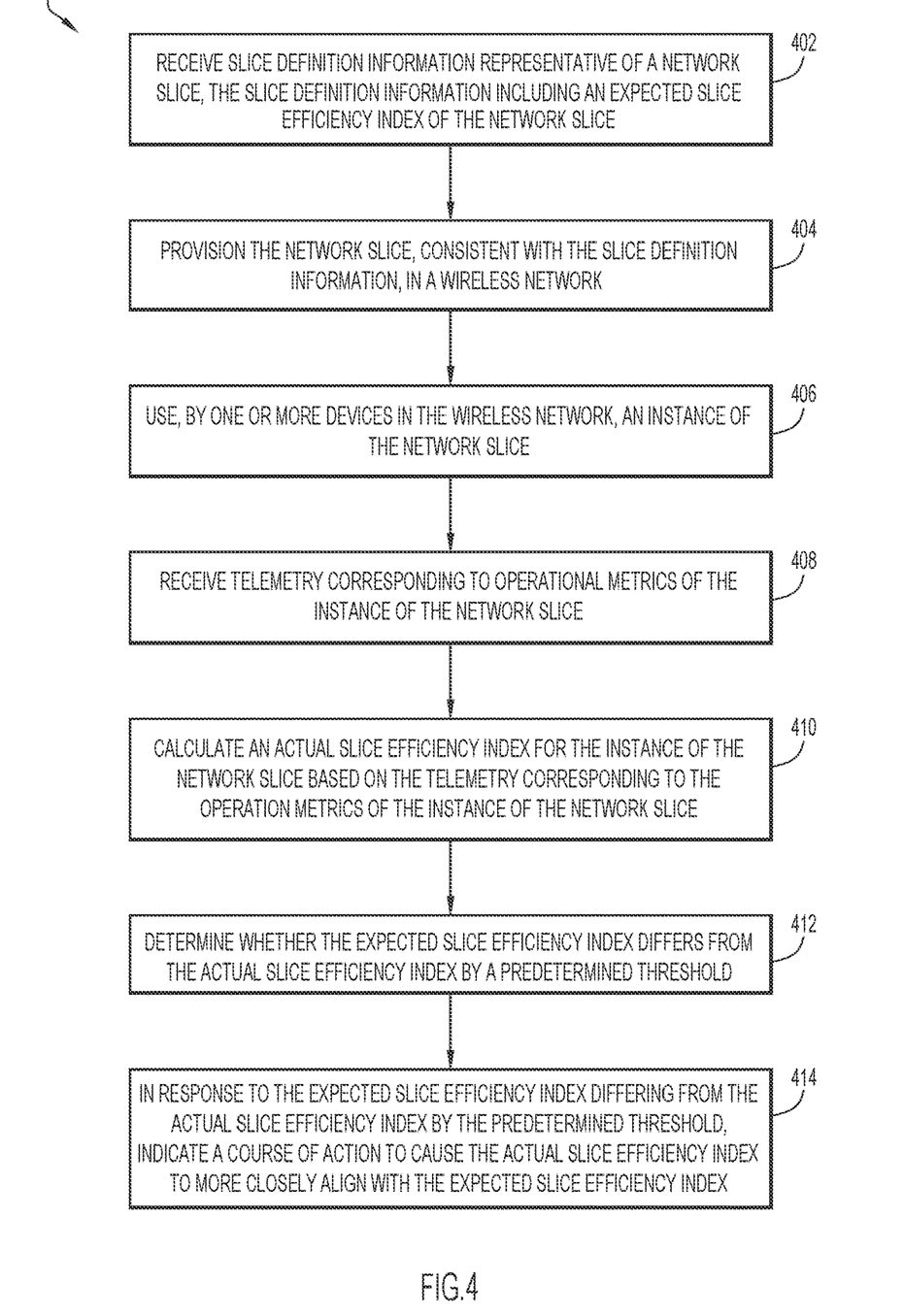
FIG. 4 is a flowchart showing a series of operations for defining, provisioning, and monitoring a network slice instance in 5G enterprise network, according to an example embodiment.

FIG. 4 is a flowchart showing a series of operations for provisioning and monitoring a network slice in 5G network, according to an example embodiment. At 402, an operation receives slice definition information representative of a network slice, the slice definition information including an expected slice efficiency index of the network slice. At 404, an operation provisions the network slice, consistent with the slice definition information, in a wireless network. At 406, an operation uses, by one or more devices in the wireless network, an instance of the network slice. At 408, an operation receives telemetry corresponding to operational metrics of the instance of the network slice. At 410, an operation calculates an actual slice efficiency index for the instance of the network slice based on the telemetry corresponding to the operation metrics of the instance of the network slice. At 412, an operation determines whether the expected slice efficiency index differs from the actual slice efficiency index by a predetermined threshold. And, at 414, in response to the expected slice efficiency index differing from the actual slice efficiency index by the predetermined threshold, an operation indicates a course of action to cause the actual slice efficiency index to more closely align with the expected slice efficiency index.

Figure 5:
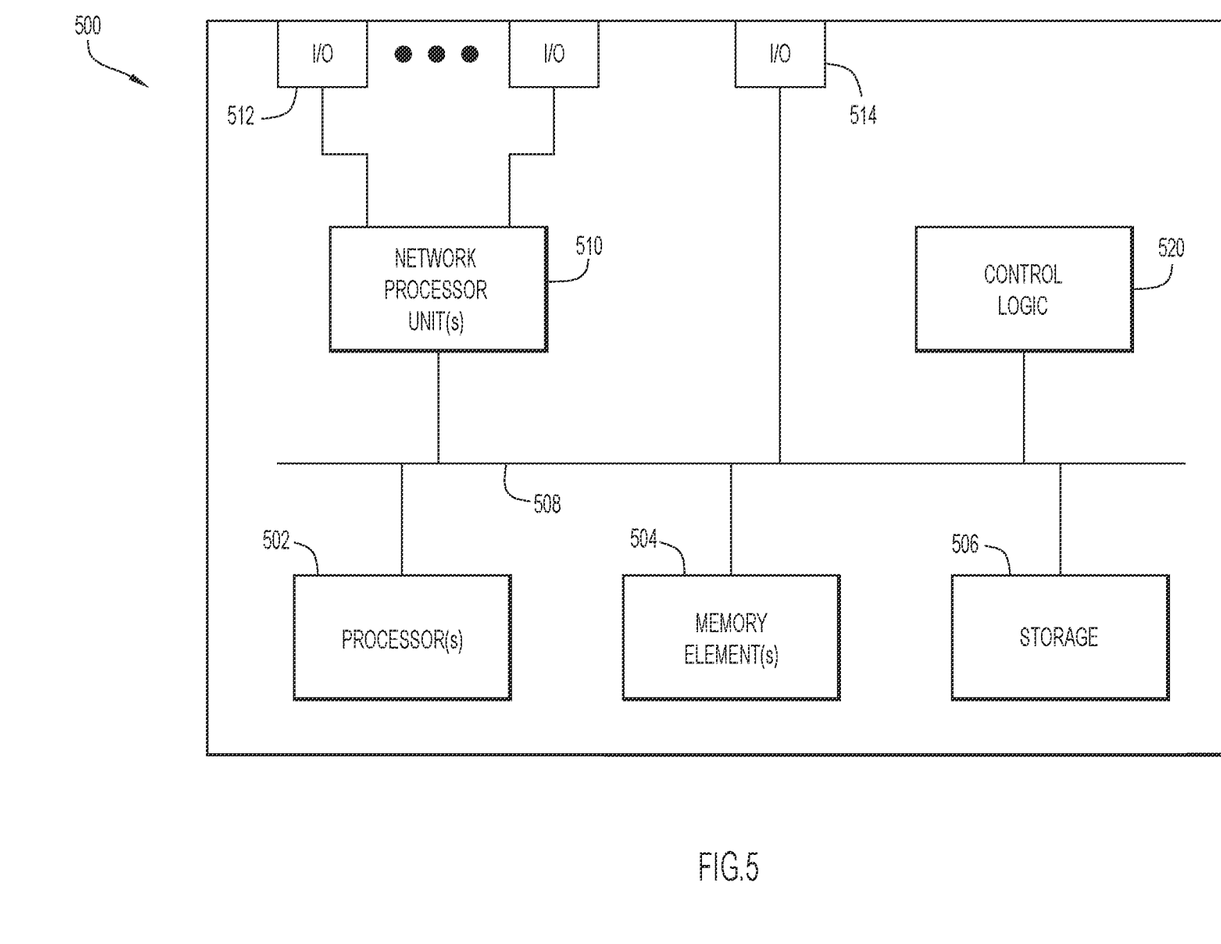
FIG. 5 illustrates a hardware block diagram of a computing device that may be configured to execute enterprise slice provisioning logic, according to an example embodiment.

FIG. 5 illustrates a hardware block diagram of a computing device that may be configured to execute enterprise slice provisioning logic 200, according to an example embodiment.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., enterprise slice provisioning logic 200) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., enterprise slice provisioning logic 200) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method is provided and includes receiving slice definition information representative of a network slice, the slice definition information including an expected slice efficiency index of the network slice; provisioning the network slice, consistent with the slice definition information, in a wireless network; receiving telemetry corresponding to operational metrics of an instance of the network slice that is used by one or more devices in the wireless network; calculating an actual slice efficiency index for the instance of the network slice based on the telemetry corresponding to the operation metrics of the instance of the network slice; determining whether the expected slice efficiency index differs from the actual slice efficiency index by a predetermined threshold; and in response to the expected slice efficiency index differing from the actual slice efficiency index by the predetermined threshold, indicating a course of action to cause the actual slice efficiency index to more closely align with the expected slice efficiency index.

In an embodiment, the wireless network includes a 5G wireless network, and the 5G wireless network includes an enterprise 5G wireless network.

In an embodiment, the slice definition information further includes allowed site information indicative of one or more sites in which the network slice is permitted to be operational.

In an embodiment, the slice definition information further includes a golden image index indicative of an expected percentage of devices, on which the instance of the network slice is operational, operate with a golden image.

In an embodiment, the slice definition information further includes an unclassified application index indicative of a percentage of unclassified applications accessed by the instance of the network slice.

In an embodiment, the slice definition information further includes a device type affinity list indicative of a predetermined class of device upon which the instance of the network slice is permitted to operate The method may further include assigning respective priority weights to aspects of the slice definition information.

The method may further include calculating the actual slice efficiency index for the instance of the network slice based on the respective priority weights.

In an embodiment, the course of action to cause the actual slice efficiency index to more closely align with the expected slice efficiency index includes changing physical equipment in the wireless network.

In another embodiment, a device is provided. The device includes an interface configured to enable network communications, a memory, and one or more processors coupled to the interface unit and the memory, and configured to: receive slice definition information representative of a network slice, the slice definition information including an expected slice efficiency index of the network slice; provision the network slice, consistent with the slice definition information, in a wireless network receive telemetry corresponding to operational metrics of an instance of the network slice that is used by one or more devices in the wireless network; calculate an actual slice efficiency index for the instance of the network slice based on the telemetry corresponding to the operation metrics of the instance of the network slice; determine whether the expected slice efficiency index differs from the actual slice efficiency index by a predetermined threshold; and in response to the expected slice efficiency index differing from the actual slice efficiency index by the predetermined threshold, indicate a course of action to cause the actual slice efficiency index to more closely align with the expected slice efficiency index.

In an embodiment, the wireless network includes a 5G wireless network, and the 5G wireless network may include an enterprise 5G wireless network.

In an embodiment, the slice definition information further includes allowed site information indicative of one or more sites in which the network slice is permitted to be operational.

In an embodiment, the slice definition information further includes a golden image index indicative of an expected percentage of devices, on which the instance of the network slice is operational, operate with a golden image.

In an embodiment, the slice definition information further includes an unclassified application index indicative of a percentage of unclassified applications accessed by the instance of the network slice.

In an embodiment, the slice definition information further includes a device type affinity list indicative of a predetermined class of device upon which the instance of the network slice is permitted to operate.

In still another embodiment, a non-transitory computer readable storage media encoded with instructions is provided. When executed by a processor, the instructions cause the processor to: receive slice definition information representative of a network slice, the slice definition information including an expected slice efficiency index of the network slice; provision the network slice, consistent with the slice definition information, in a wireless network; receive telemetry corresponding to operational metrics of an instance of the network slice that is used by one or more devices in the wireless network; calculate an actual slice efficiency index for the instance of the network slice based on the telemetry corresponding to the operation metrics of the instance of the network slice; determine whether the expected slice efficiency index differs from the actual slice efficiency index by a predetermined threshold; and in response to the expected slice efficiency index differing from the actual slice efficiency index by the predetermined threshold, indicate a course of action to cause the actual slice efficiency index to more closely align with the expected slice efficiency index.

In an embodiment, the slice definition information further includes allowed site information indicative of one or more sites in which the network slice is permitted to be operational.

In an embodiment, the slice definition information further includes a golden image index indicative of an expected percentage of devices, on which the instance of the network slice is operational, operate with a golden image.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving slice definition information representative of a network slice, the slice definition information including an expected slice efficiency index of the network slice;
   provisioning the network slice, consistent with the slice definition information, in a wireless network;
   receiving telemetry corresponding to operational metrics of an instance of the network slice that is used by one or more devices in the wireless network;
   calculating an actual slice efficiency index for the instance of the network slice based on the telemetry corresponding to the operation metrics of the instance of the network slice;
   determining whether the expected slice efficiency index differs from the actual slice efficiency index by a predetermined threshold; and
   in response to the expected slice efficiency index differing from the actual slice efficiency index by the predetermined threshold, indicating a course of action to cause the actual slice efficiency index to more closely align with the expected slice efficiency index.

2. The method of claim 1, wherein the wireless network comprises a Fifth Generation (5G) wireless network.

3. The method of claim 2, wherein the 5G wireless network comprises an enterprise 5G wireless network.

4. The method of claim 1, wherein the slice definition information further includes allowed site information indicative of one or more sites in which the network slice is permitted to be operational.

5. The method of claim 1, wherein the slice definition information further includes a golden image index indicative of an expected percentage of devices, on which the instance of the network slice is operational, operate with a golden image.

6. The method of claim 1, wherein the slice definition information further includes an unclassified application index indicative of a percentage of unclassified applications accessed by the instance of the network slice.

7. The method of claim 1, wherein the slice definition information further includes a device type affinity list indicative of a predetermined class of device upon which the instance of the network slice is permitted to operate.

8. The method of claim 1, further comprising assigning respective priority weights to aspects of the slice definition information.

9. The method of claim 8, further comprising calculating the actual slice efficiency index for the instance of the network slice based on the respective priority weights.

10. The method of claim 1, wherein the course of action to cause the actual slice efficiency index to more closely align with the expected slice efficiency index comprises changing physical equipment in the wireless network.

11. A device comprising:
    an interface configured to enable network communications;
    a memory; and
    one or more processors coupled to the interface and the memory, and configured to:
       receive slice definition information representative of a network slice, the slice definition information including an expected slice efficiency index of the network slice;
       provision the network slice, consistent with the slice definition information, in a wireless network;
       receive telemetry corresponding to operational metrics of an instance of the network slice that is used by one or more devices in the wireless network;
       calculate an actual slice efficiency index for the instance of the network slice based on the telemetry corresponding to the operation metrics of the instance of the network slice;
       determine whether the expected slice efficiency index differs from the actual slice efficiency index by a predetermined threshold; and
       in response to the expected slice efficiency index differing from the actual slice efficiency index by the predetermined threshold, indicate a course of action to cause the actual slice efficiency index to more closely align with the expected slice efficiency index.

12. The device of claim 11, wherein the wireless network comprises a Fifth Generation (5G) wireless network.

13. The device of claim 12, wherein the 5G wireless network comprises an enterprise 5G wireless network.

14. The device of claim 11, wherein the slice definition information further includes allowed site information indicative of one or more sites in which the network slice is permitted to be operational.

15. The device of claim 11, wherein the slice definition information further includes a golden image index indicative of an expected percentage of devices, on which the instance of the network slice is operational, operate with a golden image.

16. The device of claim 11, wherein the slice definition information further includes an unclassified application index indicative of a percentage of unclassified applications accessed by the instance of the network slice.

17. The device of claim 11, wherein the slice definition information further includes a device type affinity list indicative of a predetermined class of device upon which the instance of the network slice is permitted to operate.

18. A non-transitory computer readable storage media encoded with instructions that, when executed by a processor, cause the processor to:
    receive slice definition information representative of a network slice, the slice definition information including an expected slice efficiency index of the network slice;
    provision the network slice, consistent with the slice definition information, in a wireless network;
    receive telemetry corresponding to operational metrics of an instance of the network slice that is used by one or more devices in the wireless network;
    calculate an actual slice efficiency index for the instance of the network slice based on the telemetry corresponding to the operation metrics of the instance of the network slice;
    determine whether the expected slice efficiency index differs from the actual slice efficiency index by a predetermined threshold; and
    in response to the expected slice efficiency index differing from the actual slice efficiency index by the predetermined threshold, indicate a course of action to cause the actual slice efficiency index to more closely align with the expected slice efficiency index.

19. The non-transitory computer readable storage media of claim 18, wherein the slice definition information further includes allowed site information indicative of one or more sites in which the network slice is permitted to be operational.

20. The non-transitory computer readable storage media of claim 18, wherein the slice definition information further includes a golden image index indicative of an expected percentage of devices, on which the instance of the network slice is operational, operate with a golden image.

* * * * *